(12) United States Patent
Li et al.

(10) Patent No.: US 12,053,701 B2
(45) Date of Patent: Aug. 6, 2024

(54) REAL-TIME AUDIO PROCESSING METHOD, SYSTEM, DEVICE AND MEDIUM

(71) Applicant: Shanghai Lilith Technology Corporation, Shanghai (CN)

(72) Inventors: Guanyu Li, Shanghai (CN); Qiao Xue, Shanghai (CN); Xinyue Gao, Shanghai (CN)

(73) Assignee: Shanghai Lilith Technology Corporation, Shanghai (CN)

( * ) Notice: Subject to any disclaimer, the term of this patent is extended or adjusted under 35 U.S.C. 154(b) by 0 days.

(21) Appl. No.: 18/547,281

(22) PCT Filed: Dec. 23, 2021

(86) PCT No.: PCT/CN2021/140796
§ 371 (c)(1),
(2) Date: Aug. 21, 2023

(87) PCT Pub. No.: WO2022/174673
PCT Pub. Date: Aug. 25, 2022

(65) Prior Publication Data
US 2024/0157242 A1 May 16, 2024

(30) Foreign Application Priority Data
Feb. 22, 2021 (CN) .......................... 202110196468.2

(51) Int. Cl.
*A63F 13/54* (2014.01)
*A63F 13/814* (2014.01)
(52) U.S. Cl.
CPC ............ *A63F 13/54* (2014.09); *A63F 13/814* (2014.09)

(58) Field of Classification Search
CPC ............................. A63F 13/54; A63F 13/814
See application file for complete search history.

(56) References Cited

U.S. PATENT DOCUMENTS

| 6,379,244 B1* | 4/2002 | Sagawa | G10H 1/0008 463/7 |
| 2003/0029305 A1* | 2/2003 | Kent | G11B 27/005 84/645 |
| 2019/0279679 A1 | 9/2019 | Riley | |

FOREIGN PATENT DOCUMENTS

| CN | 102842319 A | 12/2012 |
| CN | 105448283 A | 3/2016 |
| CN | 111782865 A | 10/2020 |

* cited by examiner

*Primary Examiner* — James S. McClellan
(74) *Attorney, Agent, or Firm* — David R. Stevens; Stevens Law Group

(57) ABSTRACT

The present invention relates to the field of audio processing technology, and more particularly, to a real-time audio processing method, system, device, and medium. The method including: receiving real-time audio data, and storing the audio data in a buffer, wherein the audio data is stored in a plurality of blocks in the buffer, and each block includes a certain number of sampling points; obtaining displacement data of a user's operation; said reading and playing one of the blocks at the corresponding position in the buffer, based on the speed and acceleration calculated from the displacement data. Achieving interaction between a user and real-time audio, including supporting a game player to perform interaction with real-time audio in a game to complete a scratching sound effect, restoring a mechanical scratching effect, and the transition of the sound effect is delicate and smooth, the hardware performance cost is small.

9 Claims, 3 Drawing Sheets

REAL-TIME AUDIO PROCESSING METHOD, SYSTEM, DEVICE AND MEDIUM

TECHNICAL FIELD

The present invention relates to the field of audio processing technology, and more particularly, to a real-time audio processing method, system, device, and medium.

BACKGROUND

The audio of most games is achieved by playing samples (i.e., pre-recorded or produced audio files). In part, various effectors may be used to further process the audio in real time. For example, reverberation of a room, low-pass filtering of distant sounds. However, they are more likely that the sound is triggered or changed following a picture or scene, and none of them relate to interactions between specific player and sounds, including scratching effect.

Most of the prior art for real-time processing of audio has been applied to the field of music making software, and there is no good solution to achieve real-time processing of sounds in the game, especially the scratching effect.

SUMMARY

The object of this invention is to provide a real-time audio processing method, system, device and medium for achieving interaction between a user and real-time audio, including supporting a game player to perform interaction with real-time audio in a game to complete a scratching sound effect, restoring a mechanical scratching effect, and the transition of the sound effect is delicate and smooth.

An embodiment of the present invention discloses a real-time audio processing method applied to a terminal, the method including:
step 1, receiving real-time audio data, and storing the audio data in a buffer, wherein the audio data is stored in a plurality of blocks in the buffer, and each block includes a certain number of sampling points;
step 2, obtaining displacement data of a user's operation;
step 3, reading and playing one of the blocks at the corresponding position in the buffer, based on the speed and acceleration calculated from the displacement data, wherein according to the formulas the speed $$v = \frac{x - x_p}{s}$$

and the acceleration $$a = \frac{v - v_p}{b}$$

are calculated, wherein x represents the preprocessed displacement data, $x_p$ represents the preprocessed displacement data received before playing the previous block, s represents an adjustable coefficient for adjusting the sensitivity of the response to the user's operation, $v_p$ represents the speed calculated before playing the previous block, and b represents the number of the groups of sampling points in the block, wherein the group of sampling points represents a group of sampling points having the same time and different channels.

Optionally, step 2 further includes:
determining whether the user has not performed an operation or has stopped the operation;
if so, playing the audio data in real time at a normal speed;
if not, performing step 3.

Optionally, said reading and playing one of the blocks at the corresponding position in the buffer, based on the speed and acceleration calculated from the displacement data, further includes:
determining the block to be read according to the speed and acceleration;
processing the sampling points in the block according to the speed and acceleration.

Optionally, the above processing of the sampling points in the block includes linear interpolating.

Optionally, the foregoing preprocessing of the displacement data includes:
scaling the received value of the displacement data, so that the range of the value of the displacement data that can be received is an interval: [0, the number of the groups of sampling points in the buffer].

Optionally, foregoing reading and playing one of the blocks at the corresponding position in the buffer, based on the speed and acceleration calculated from the displacement data, further includes adding noise to the block prior to playing the block, wherein the magnitude of the noise is proportional to the speed.

An embodiment of the present invention discloses a real-time audio processing system, including an audio data receiving module, a displacement data obtaining module, and a playing module;
the audio data receiving module receives real-time audio data, and storing the audio data in a buffer, wherein the audio data is stored in a plurality of blocks in the buffer, and each block includes a certain number of sampling points;
the displacement data obtaining module obtains displacement data of a user's operation;
the playing module reads and plays one of the blocks at the corresponding position in the buffer, based on the speed and acceleration calculated from the displacement data, wherein according to the formulas the speed $$v = \frac{x - x_p}{s}$$

and the acceleration $$a = \frac{v - v_p}{b}$$

are calculated, wherein x represents the preprocessed displacement data, $x_p$ represents the preprocessed displacement data received before playing the previous block, s represents an adjustable coefficient for adjusting the sensitivity of the response to the user's operation, $v_p$ represents the speed calculated before playing the previous block, and b represents the number of the groups of sampling points in the block, wherein the group of sampling points represents a group of sampling points having the same time and different channels.

An embodiment of the present invention discloses a real-time audio processing device, including a memory storing computer-executable instructions and a processor configured to execute the instructions to implement the real-time audio processing method.

An embodiment of the present invention discloses a computer storage medium encoded using a computer program, the computer program including instructions that are executed by more than one computer to implement the real-time audio processing method.

Compared with the prior art, the embodiments of this invention have the following main differences and effects:

In the present invention, receiving real-time audio data, and storing the audio data in a buffer, since no real record exists, the played audio data does not reside in the memory. Therefore, a buffer is set, and a small piece of sound in the past (for example, about 1~4 seconds) is buffered for use.

In the present invention, the audio data is stored in a plurality of blocks in the buffer, and each block includes a certain number of sampling points; when processing audio data, may reading one block of data each time, and preprocessing the data as a whole, and then preprocessing each sampling point, so that hardware performance requirements can be reduced, data reading time can be reduced, and computing performance can be improved.

In the present invention, step 2, obtaining displacement data of a user's operation; step 3, reading and playing one of the blocks at the corresponding position in the buffer, based on the speed and acceleration calculated from the displacement data, wherein according to the formulas the speed $$v = \frac{x - x_p}{s}$$

and the acceleration $$a = \frac{v - v_p}{b}$$

are calculated, wherein x represents the preprocessed displacement data, $x_p$ represents the preprocessed displacement data received before playing the previous block, s represents an adjustable coefficient for adjusting the sensitivity of the response to the user's operation, $v_p$ represents the speed calculated before playing the previous block, and b represents the number of the groups of sampling points in the block, wherein the group of sampling points represents a group of sampling points having the same time and different channels. Obtaining the user's operation information, and playing the audio data stored in the buffer for a certain period of time according to the speed, acceleration of the operation, can simulate scratching on real-time audio. Although it is accurate to obtain the finger displacement information in real time, while processing each sample point, but it is too expensive to do so, and the general hardware does not have such a high refresh rate. Reading data in units of blocks, obtaining the displacement data of user's operation before reading each time, calculating the speed according to the displacement data, and playing the block data according to the speed, so that the calculation amount can be reduced, the hardware performance requirement can be reduced, and the audio data processing speed can be accelerated. The acceleration calculated according to the displacement data is superimposed on the speed, and playing the block of data according to the calculated speed and acceleration, so that can further improve the smoothness of audio playing.

In the present invention, step 2 further includes: determining whether the user has not performed an operation or has stopped the operation; if so, playing the audio data in real time at a normal speed; If not, performing step 3. Real-time audio can be played normally when the user is not operating. After the user operates, for example, when scratching, the user scratches back and then stops operation directly, if the sound returns to the normal playing speed at the position where the user stopped, then there will be a certain time difference between the next played audio and the real-time audio, that is, there will be a delay. Therefore, in the present invention, assuming that when the user stops operation, it is equivalent to instantly fast-forwarding the record to the position where it should be played if it has been played at normal speed, and then resumes normal playing, which can solve the problem of delay.

In the present invention, said reading and playing one of the blocks at the corresponding position in the buffer, based on the speed and acceleration calculated from the displacement data, further includes: determining the block to be read according to the speed and acceleration; processing the sampling points in the block according to the speed and acceleration. The buffer can be addressed according to the user's operation, and the sampling points in the block at the corresponding position can be processed, so that the audio can be played according to the speed and acceleration of the user's operation after being output to the sound card and other hardware. Since the essence of scratching is the result of "alternative high-magnification fast playing and slow playing" of the sound, the pitch is high when the playing speed is fast, and the pitch is low when the playing speed is slow. Playing audio according to the speed and acceleration of the user's operation can simulate the effect of scratching. Other processes can also be performed.

In the present invention, the processing of the sampling points in the block includes linear interpolating. If the user drags too slowly during operation, since the sampling points in the buffered data are limited, it is possible to access the same point in the buffered data for a period of time when several new sampling points are generated, and the output waveform is similar to the sawtooth, and a large number of high-frequency components are introduced, so that the sound sounds a harsh part. Interpolation can greatly reduce this problem, and linear interpolation has low performance requirements and is fast.

In the present invention, the foregoing preprocessing of the displacement data includes: scaling the received value of the displacement data, so that the range of the value of the displacement data that can be received is an interval: [0, the number of the groups of sampling points in the buffer]. Since the value of the displacement data can only be addressed at a certain position in the buffer, the value of the displacement data is scaled to be mapped to the corresponding address range of the buffer, thereby facilitating the addressing according to the displacement data.

In the present invention, reading and playing one of the blocks at the corresponding position in the buffer, based on the speed and acceleration calculated from the displacement data, further includes adding noise to the block prior to playing the block, wherein the magnitude of the noise is proportional to the speed; Can simulate the sound produced by the rapid friction of the stylus on the surface of the record when scratching. The sound of this friction is related to the speed of the scratch.

DETAILED DESCRIPTION

Figure 1:
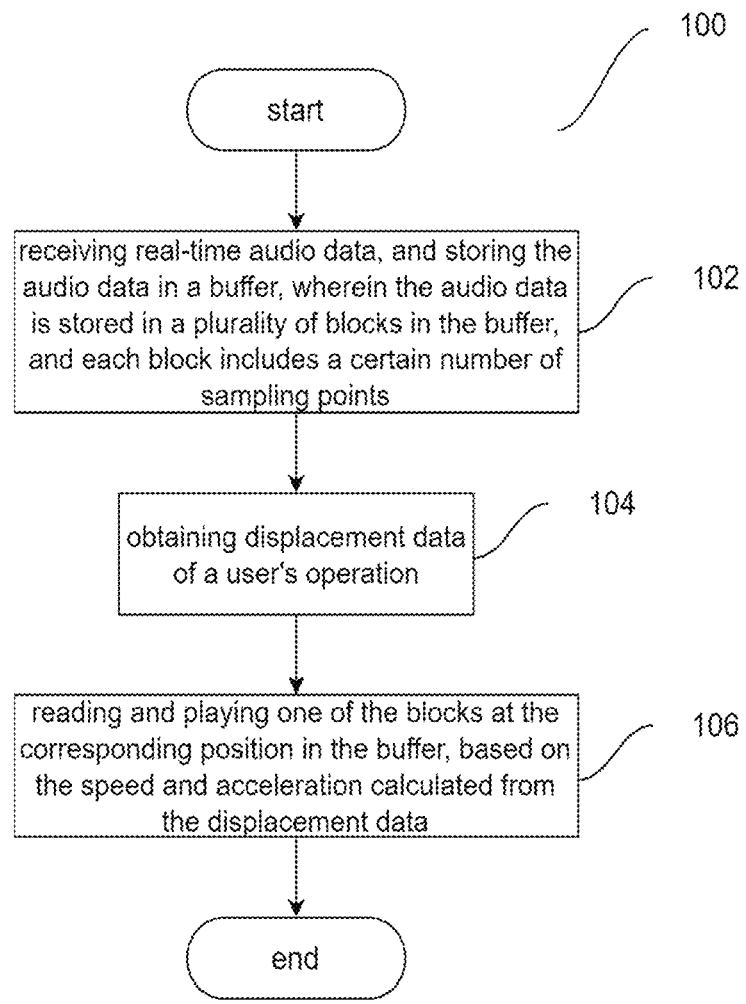
FIG. 1 illustrates a flowchart of a real-time audio processing method according to an embodiment of this invention.

The present application is further described below with reference to specific embodiments and the drawings. It should be understood that the specific embodiments described herein are used merely to explain the present application, but are not intended to limit the present application. In addition, for ease of description, only some but not all structures or processes related to the present application are shown in the drawings. It should be noted that in this description, similar numerals and letters designate like items in the following drawings.

It should be understood that although the terms first, second, etc. may be used in the present disclosure to describe various features, these features should not be limited to these terms. These terms are used for distinction only and shall not be understood as an indication or implication of relative importance. For example, without departing from the scope of example embodiments, a first feature may be referred to as a second feature, and similarly a second feature may be referred to as a first feature.

In the description of the present application, it is also to be noted that, unless expressly stated and defined otherwise, the terms "arrangement", "connection", "link" are to be understood in a broad sense, for example, as a fixed connection, as a detachable connection, or as an integrated connection; may be a mechanical connection or an electrical connection; may be directly connected or indirectly connected by means of an intermediate medium, and may be internal communication of the two elements. The specific meaning of the above terms in this embodiment will be understood by one of ordinary skill in the art.

Illustrative embodiments of the present application include, but are not limited to, real-time audio processing method, system, device and medium.

Various aspects of the illustrative embodiments are described by using terms commonly used by persons skilled in the art to convey the substance of their work to others skilled in the art. However, it is apparent to the persons skilled in the art that some alternative embodiments may be practiced by using some of the described features. For purposes of explanation, specific numbers and configurations are set forth in order to provide a more thorough understanding of the illustrative embodiments. However, it is apparent to the persons skilled in the art that alternative embodiments may be practiced without the specific details. In other instances, well-known features have been omitted or simplified herein in order to avoid obscuring the illustrative embodiments of the application.

In addition, various operations will be described as a plurality of operations separated from each other in a manner most conducive to understanding the illustrative embodiments; however, the order of description should not be construed as to imply that these operations are necessarily dependent on the order of description, many of which operations may be performed in parallel, concurrently, or simultaneously. In addition, the order of operations can also be rearranged. When the described operations are completed, the processing may be terminated, but may further have additional steps not included in the figures. The processing may be corresponding to a method, a function, a procedure, a subroutine, a subprogram, or the like.

References in the specification to "an embodiment", "embodiment", "illustrative embodiment" and the like indicate that the described embodiments may include specific features, structures or properties, but each embodiment may or may not necessarily include specific features, structures or properties. Moreover, these phrases do not necessarily refer to the same embodiment. Furthermore, when certain features are described with reference to specific embodiments, the knowledge of the persons skilled in the art can affect the combination of these features with other embodiments, whether or not those embodiments are explicitly described.

Unless the context otherwise requires, the terms "comprising," "having," and "including" are synonyms. The phrase "A and/or B" indicates "(A), (B) or (A and B)".

As used herein, the term "module" may refer to, be a part of, or include: a memory (shared, dedicated, or group), an application-specific integrated circuit (ASIC), an electronic circuit, and/or a processor (shared, dedicated, or a group) that can execute one or more software or firmware programs, a combinatorial logic circuit, and/or another proper component that provides the function.

In the drawings, some structural or methodological features may be shown in a particular arrangement and/or order. However, it should be understood that no such specific arrangement and/or ordering is required. Rather, in some embodiments, features may be described in a different manner and/or order than shown in the illustrative figures. In addition, the inclusion of structural or methodological features in a particular figure does not imply that all embodiments need to include such features, and in some embodiments, these features may not be included or may be combined with other features.

To make the objectives, technical solutions, and advantages of the present application clearer, the following further describes the embodiments of the present application in detail with reference to the accompanying drawings.

The object of this invention is for achieving interaction between a user and real-time audio, including supporting a game player to perform interaction with real-time audio in a game to complete a scratching sound effect, restoring a mechanical scratching effect, and the transition of the sound effect is delicate and smooth.

The scratching effect refers to a general term in which a finger pushes a record on a record player, artificially interferes with the speed of rotation of the record, so that the speed of the record changes drastically, resulting in artificially varying pitch altitudes, and other additional distortion effects. The above principles can be modeled as follows:

The essence of scratching is the result of sound "alternating high-magnification fast playing and slow playing". Assuming that the normal playing speed direction of the record is positive, then when the record is scratched in the negative direction, a negative acceleration will be generated. This acceleration causes the original forward speed to decrease and the pitch to decrease. Next, the acceleration completely cancels out the positive speed, the record begins to reverse, the negative speed is generated, and the negative speed becomes larger and larger due to the existence of the acceleration. At the same time as the record reverses, the pitch gradually rises again until the negative acceleration disappears. When the negative acceleration disappears, since the record itself continues to play forward, the player itself generates a positive acceleration until the playing speed returns to normal, but at this time the playing position is less than (the original position+The displacement that should elapse after the elapsed time). In this process, the speed of the record reversal decreases, and the pitch decreases again until the speed reverses to the forward speed and eventually returns to the normal speed. Of course, the user may also apply a positive acceleration to the record, which is superimposed on the acceleration generated by the record player itself.

In reality, the record can be scratched backwards or forwards, because all the audio information has been recorded on the record. However, if the sound is processed in real time, we cannot know what sound will appear in the future. Therefore, only the process of "scratching back" and "stop after scratching back and returning to the original position" can be simulated. Also, if the user releases the hand directly after scratching back, and if the sound returns to the normal playing speed at the position of the release, there is a certain delay in the playing process and in the actual sound. Therefore, in the present invention, assuming that when the user stops operation, it is equivalent to instantly fast-forwarding the record to the position where it should be played if it has been played at normal speed, and then resumes normal playing.

FIG. 1 illustrates a flowchart of a real-time audio processing method according to an embodiment of this invention.

As shown in FIG. 1, the method includes:
step 102, receiving real-time audio data, and storing the audio data in a buffer, wherein the audio data is stored in a plurality of blocks in the buffer, and each block includes a certain number of sampling points;
step 104, obtaining displacement data of a user's operation;
step 106, reading and playing one of the blocks at the corresponding position in the buffer, based on the speed and acceleration calculated from the displacement data, wherein according to the formulas the speed $$v = \frac{x - x_p}{s}$$

and the acceleration $$a = \frac{v - v_p}{b}$$

are calculated, wherein x represents the preprocessed displacement data, $x_p$ represents the preprocessed displacement data received before playing the previous block, s represents an adjustable coefficient for adjusting the sensitivity of the response to the user's operation, $v_p$ represents the speed calculated before playing the previous block, and b represents the number of the groups of sampling points in the block, wherein the group of sampling points represents a group of sampling points having the same time and different channels.

For example, in some scene (e.g., in a game), some real-time sounds (e.g., in-game real-time generated sounds, externally input sounds) may be generated or input, a scratching effect may be simulated on these real-time sounds. May setting a buffer, is receiving real-time audio data of the sounds, and storing the audio data in a buffer, wherein the audio data is stored in a plurality of blocks in the buffer, and each block includes a certain number of sampling points. When a user (e.g., a game player) clicks on a screen, obtaining displacement data of a user's operation (e.g., a position of a point of click of a user's finger or mouse pointer on the screen) at a certain interval (e.g., at a certain time interval, a screen refresh interval, or at an interval of reading a certain amount of data). Calculating the motion parameters of user's operation such as speed and acceleration from the obtained displacement data, and reading and playing the audio data from these motion parameters (for example, mapping the motion parameters to the addressing speed and acceleration in the buffer and/or the speed and acceleration at which the audio data is played). Specifically, for example, in a game, a game player interacts with a sound generated in real time or an externally inputted voice when the game is played, and in a scene in which a scratching effect is simulated on the sound, preventing the received real-time audio data from being sent to a sound card and storing it in a buffer, which may be a circular buffer in which a writing pointer advances in a direction as the data is buffered in the buffer, and when the writing pointer reaches the end of the buffer, the writing pointer returns to the beginning of the buffer, so that the buffer becomes a circular buffer. Playing the real-time audio is normally when the player is not scratching. When a game player starts to scratch an interactive control (e.g., a virtual CD) displayed on a screen, obtaining a position of a click point of a finger or a mouse pointer of the player on the screen, and when the game player starts to scratch back on the screen, the positions may be obtained three times at a certain time interval, then calculating a difference between each two adjacent times in the positions of the three click points as a displacement, calculating a corresponding speed and an acceleration according to these displacements, and then the reading pointer addresses back from its current position in the buffer, reading and playing a block at the corresponding position in the buffer. During the player's scratching process, each time a block is read and played, a position of a click point of a player is obtained and preprocessed, and after each time a new click point position is obtained and preprocessed, according to the preprocessed click point position x, the preprocessed last click point position $x_p$, and according to the formula $$v = \frac{x - x_p}{s},$$

calculating the corresponding player's scratching speed v, and calculating the corresponding player's scratching acceleration a according to the speed v and the last calculated speed $v_p$, and according to the formula $$a = \frac{v - v_p}{b},$$

s represents an adjustable coefficient, and the adjustable coefficient is used to adjust the sensitivity of the response to the user's operation action, b represents the number of the groups of sampling points in each block, wherein the group of sampling points represents a group of sampling points having the same time and different channels. Then reading and playing the next block according to speed v and acceleration a.

In the present invention, may reading one block of data each time, and preprocessing the data as a whole, and then preprocessing each sampling point, so that hardware performance requirements can be reduced, data reading time can be reduced, and computing performance can be improved.

Obtaining the user's operation information, and playing the audio data stored in the buffer for a certain period of time according to the speed, acceleration of the operation, can simulate scratching on real-time audio. Although it is accurate to obtain the finger displacement information in real time, while processing each sample point, but it is too expensive to do so, and the general hardware does not have such a high refresh rate. Reading data in units of blocks, obtaining the displacement data of user's operation before reading each time, calculating the speed according to the displacement data, and playing the block data according to the speed, so that the calculation amount can be reduced, the hardware performance requirement can be reduced, and the audio data processing speed can be accelerated. The acceleration calculated according to the displacement data is superimposed on the speed, and playing the block of data according to the calculated speed and acceleration, so that can further improve the smoothness of audio playing.

According to some embodiments of the present application, step 2 further includes:
  determining whether the user has not performed an operation or has stopped the operation;
  if so, playing the audio data in real time at a normal speed;
  if not, performing step 3.

Real-time audio can be played normally when the user is not operating. After the user operates, for example, when scratching, the user scratches back and then stops directly, if the sound returns to the normal playing speed at the position where the user stopped, then there will be a certain time difference between the next played audio and the real-time audio, that is, there will be a delay. Therefore, in the present invention, assuming that when the user stops, it is equivalent to instantly fast-forwarding the record to the position where it should be played if it has been played at normal speed, and then resumes normal playing, which can solve the problem of delay.

According to some embodiments of the present application, the foregoing preprocessing of the displacement data includes:
  scaling the received value of the displacement data, so that the range of the value of the displacement data that can be received is an interval: [0, the number of the groups of sampling points in the buffer].

For example, a variable scra_pos is used to store a value after preprocessing an incoming operation value (data for drag displacement or speed). The preprocessing method is as follows:

scra_pos=Clamp(Abs(mouse_pos), 0, max_mouse_pos)*factor;

The method maps the data generated by the operation to a range of [0, less than or equal to the number of sample points groups buffered by p_buffer], based on which the subsequent operation is performed. Mapping to this range is because addressing can only be done within this range. Here, the max_mouse_pos needs to be set at the time of initialization according to the actual situation. For example, if operating on a screen, the range can be limited to several hundred pixels. After the range is exceeded, the performance in the DSP is that the position is fixed at the maximum value. The factor is also calculated at initialization. The function is to scale the values in the range of max_mouse_pos to the range corresponding to p_buffer[ ], the algorithm being:

factor=(total_samps−buffer_size)/max_mouse_pos/channels;

In the present invention, since the value of the displacement data can only be addressed at a certain position in the buffer, the value of the displacement data is scaled to be mapped to the corresponding address range of the buffer, thereby facilitating the addressing according to the displacement data.

According to some embodiments of the present application, reading and playing one of the blocks at the corresponding position in the buffer, based on the speed and acceleration calculated from the displacement data, further includes:
  determining the block to be read according to the speed and acceleration;
  processing the sampling points in the block according to the speed and acceleration.

For example, reading and playing the next block according to speed v and acceleration a includes: determining the next block to be read according to speed v and acceleration a (for example, determining the direction of the player's scratching action according to the plus or minus of speed v and acceleration a to determine the addressing direction of the pointer in the buffer), then performing block processing @block on the block and sampling point processing @sample on the sampling points within the block, and playing the next block according to speed v and acceleration a (for example, feeding the processed block into the sound card buffer where, as the block is processed based on the corresponding speed and acceleration data, the sound card reads the sampling point data in the block, and converts the data into voltage for output according to a fixed time interval, to plays the block at the corresponding speed and acceleration).

For example, the present invention is implemented based on a DSP (Digital Signal Processing). Although all programs for processing audio and video may be considered to be performed using a DSP, in general, software for music production is implemented by VST (a set of development tools developed by Steinberg). The runtime library generated by the technology cannot be directly applied to a game engine. This can be realized through the DSP interface provided by FMOD. FMOD is an audio middleware for integrating functions such as playing control, mixing, and effect of sound into a game engine to facilitate operation and processing of sound.

Typically, more than 40,000 sampling points per second are sent to the sound card. The processing performed in @sample is generally a calculation with a small amount of calculation. Because if process each point one by one, it will inevitably have very high requirements for performance.

The general practice is to process a batch of points at a time and then send them to the sound card. This batch of sampling points is called a block. A block is a block of memory space in which several sampling points are stored. The audio program sends blocks one by one into the buffer of the sound card. The sound card reads the sampling point data in the block batch by batch, and then converts them into voltages for output according to a fixed time interval. The @block generally processes variables that don't need to change at every sampling point. Optionally, preprocessing some of the variables that changes at each sampling point, to reduce the amount of computation in @sample.

In processing the memory of the recorded sampling point, it is also necessary to pay attention to the problem of the number of channels. The sound normally heard is stereo, with two channels, i.e. the sound card outputs two sampling points of the left and right channels simultaneously. For example, a period of time is assumed to be 1024 points of audio, which actually includes 2048 points of information. The sound engine typically also supports systems such as 5.1 channels, 7.1 channels, and the like, in which case more sampling points are taken at each time. In the case of multi-channel, the sampling point information of different channels is alternately stored in the memory, so that the sampling points at the same time are adjacent. For example, the sound of the left and right channels is expressed as LRLRLRLR . . . in memory.

Hereinafter, "channels" is used to indicate the number of channels. The program generally does not change the size of the block during operation. It can therefore be treated as a constant and can be obtained at initialization. Hereinafter, block_size is used to represent the size of a block, that is, how many the groups of sampling points are included. buffer_size=block_size*channels is used to represent the number of sampling points actually contained in a block.

The block processing @block and the sampling point processing @sample may be:

Block Processing @block

This part is the operation that each block will perform. In practice, the processing of the sampling points is also completed at @block. Each sampling point in the block is traversed using a loop, that is, how the sampling point is processed.

a. Buffering Audio

Since no real record exists, the played audio data does not reside in the memory. Therefore, it is necessary to have a buffer for buffering a small piece of past sound (about 1 to 4 seconds is enough) for use. At the time of initialization, the variable buffer_blocks is assigned a value specifying the length of the blocks to be buffered.

buffer_blocks=(int)Floor(buffer_time*samplerate/block_size);

At the time of initialization, a memory with a fixed size of total_samps is applied for use as a circular buffer. Wherein, total_samps=buffer_size*buffer_blocks;

Hereinafter, the buffer is denoted by p_buffer[ ], and the nth block of the current circular buffer is recorded using a variable curr_block, then the current input buffer (assuming that its pointer address is recorded as in_buffer) is copied to the corresponding position of p_buffer[ ], and the current memory start position for buffering block is marked using a variable curr_buff_pos=curr_block*buffer_size;

Copy(in_buffer, p_buffer, current_buff_pos, buffer_size);

When each block is sent to buffer, the value of the variable curr_block is incremented by one and returned to zero when it reaches a certain value, thereby making p_buffer[ ] a circular buffer.

a. Receiving and Calculating Operation Information

The variable scra_pos is used to store a value after preprocessing an incoming operation value (drag displacement or speed data). The preprocessing method is as follows:

scra_pos=Clamp(Abs(mouse_pos), 0, max_mouse_pos)*factor);

The method maps the data generated by the operation to a range of [0, less than or equal to the number of sample points groups buffered by p_buffer], based on which the subsequent operation is performed. Mapping to this range is because addressing can only be done within this range. Here, the max_mouse_pos needs to be set at the time of initialization according to the actual situation. For example, if operating on a screen, the range can be limited to several hundred pixels. After the range is exceeded, the performance in the DSP is that the position is fixed at the maximum value. The factor is also calculated at initialization. The function is to scale the values in the range of max_mouse_pos to the range corresponding to p_buffer[ ], the algorithm being:

factor=(total_samps−buffer_size)/max_mouse_pos/channels;

With the calculated the variable scra_pos, it is reasonable to directly output the sampling point at the position (sampling point position–the rounded variable scra_pos) in the buffer to achieve the effect. However, if such output is directly performed, many problems described below will be encountered, so further processing such as the following interpolation and smoothing is required.

a. Smoothing Process-Difference and Second Order Difference

If there is only first order difference, in each block, the addressing speed does not change, and only between block and block, there is a different addressing speed. Thus, the degree of waveform density, or variation in pitch, is discontinuous. There is a lot of graininess in the sense of hearing. The second difference calculates the "rate of change of speed", that is, acceleration. By superimposing the acceleration on the addressing position of each sampling point, smoothing can be introduced to each sampling point. A continuously varying rather than abrupt waveform is thus obtained. The difference and second order difference processing is as follows:

At initialization, a variable scra_pos_prev is declared for recording the value of the variable scra_pos in the last @block. The initial value is 0. The variable scra_pos_prev_delta is declared for record the value of the variable scra_pos_delta in the last @block. The initial value is 0, and both values will be used in the following @sample.

In @block, the first order difference is calculated:

scra_pos_delta=(scr_pos−scra_pos_prev)/smooth;

Where smooth is an adjustable coefficient, and its value ranges from hundreds to tens of thousands. And is used for adjusting the sensitivity degree of the response of the scratching.

Second Order Difference:

delta_delta=(scra_pos_delta−scra_pos_prev_delta)/block_size;

The variable scra_pos_delta calculates the difference between the position information received in the two @blocks before and after, and the speed is obtained by deriving the displacement. The variable delta_delta calculates the difference between the two delta before and after, and the acceleration is obtained by deriving the speed.

Where, when the delta decays to a certain threshold, it is directly zeroed to prevent the occurrence of knocking. The algorithm is:

```
if(scra_pos_delta < 0.001 && scra_pos_delta > −0.001)
{
scra_pos_delta = 0;
}
```

Sampling Point Processing @sample

After the calculation in the above-mentioned @block has been performed, it goes to the @sample part. This part is done by two layers of loops in @block. The inner loop traverses the number of channels and operates on each sampling point, and the outer loop traverses the number of the groups of sampling points in the block. The algorithm is:

```
for(int samp = 0; samp < block_size; samp++){
  @sample
  for(int chan = 0; chan < channels; chan++){
    a. @channel
    b. buffer[chan + samp * channels]
  }
}
```

Wherein @sample and @channel are:
a. @sample
Calculating which position of data in p_buffer[ ] is currently being used when no operation is performed:

curr_pos=current_buff_pos+(samp*channels);

The values of the two_delta are updated:

scra_pos_prev_delta+=delta_delta;

scra_pos_prev+=scra_pos_prev_delta;

Calculating the variable core_pos, this variable is based on curr_pos, after calculating the displacement or speed of scratching and dragging, the buffer position that should be read:

```
core_pos = curr_pos − 2 * (int)Floor(scra_pos_prev);
if (core_pos < 0)
{
core_pos = total_samps + curr_pos − 2 * (int)Floor(scra_pos_prev);
}
```

Because core_pos is rounded, if the current addressing position falls between two sampling points, connect the two with a line and take out the value of the corresponding position on the line. The variable itp_factor for subsequent linear interpolation operations needs to be calculated:

itp_factor=scraposprev−Floor(scraposprev);

a. @channel
Specifically, when processing sampling points, a small space is needed to store the data currently being processed. Which is applied for during initialization, and its size is only one block. Which is recorded as o_buffer[ ], the variable samp_clamp is used below to mark the addressing range of sampling points whose subscript starts from 0, and is assigned during initialization. The algorithm is:

samp_clamp=total_samps−channels−1;

The addressing and difference operations are performed below and the results are stored in the o_buffer[ ]:

```
if(scra_pos_prev_delta == 0)
{
o_buffer[chan + samp * channels] = p_buffer[chan + core_pos];
}
else if(scra_pos_prev_delta > 0)
{
if(core_pos > channels)
a.  o_buffer[chan + samp * channels] = p_buffer[chan +
    core_pos] * (1 − itp_factor) + p_buffer[chan +
    core_pos − channels] * itp_factor;
else
a.  o_buffer[chan + samp * channels] = p_buffer[chan +
    core_pos] * (1 − itp_factor) + p_buffer[chan] *
    itp_factor;
}
```

-continued

```
else
{
if(core_pos < samp_clamp)
a.  o_buffer[chan + samp * channels] = p_buffer[chan +
    core_pos] * itp_factor + p_buffer[chan + core_pos +
    channels] * (1 − itp_factor);
else
a.  o_buffer[chan + samp * channels] = p_buffer[chan +
    core_pos] * itp_factor + p_buffer[chan + samp_clamp] *
    (1 − itp_factor);
}
```

First, use the variable scra_pos_prev_delta to judge whether dragging is currently in progress and the direction of dragging. If no dragging is being performed, the original data will be sent to o_buffer[ ] directly. If dragging is in progress, search the target point and the previous or subsequent point of the target point according to the dragging direction, and then conduct interpolation.

Data Return and Tag Update

Figure 2:
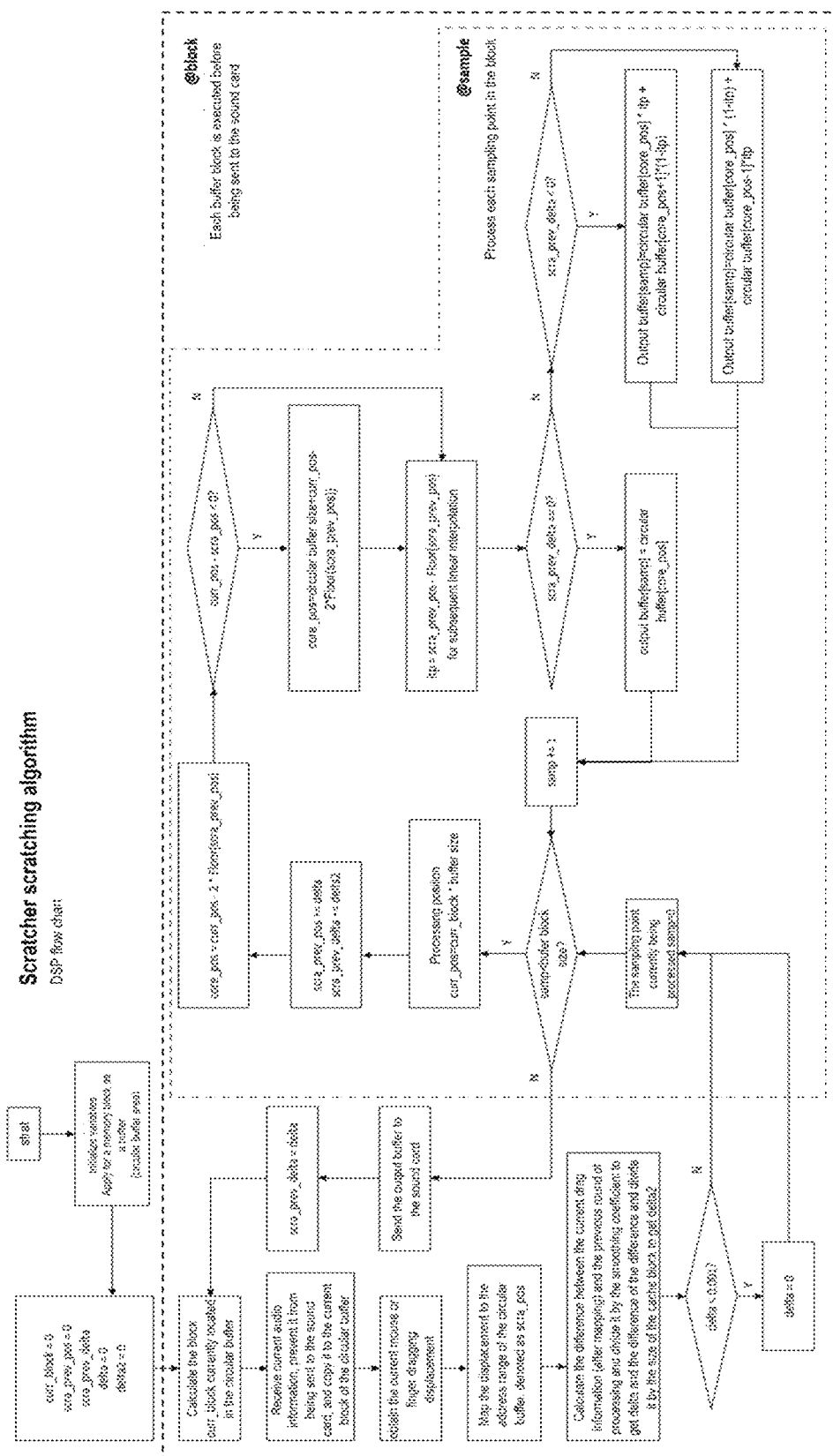
FIG. 2 illustrates a flowchart of a real-time audio processing method according to an embodiment of this invention.

After exiting the two for loops, return to the @block part, and send the data that has just been processed and stored in o_buffer[ ] to the output:
Copy(o_buffer, out_buffer, 0, buffer_size);
Update Variable:
scra_pos_prev_delta=scra_pos_delta;
current_block+=1;
if(current_block>=buffer_blocks)
current_block=0;
FIG. 2 shows a flowchart of this embodiment.

In the present invention, the buffer can be addressed according to the user's operation, and the sampling points in the block at the corresponding position can be processed, so that the audio can be played according to the speed and acceleration of the user's operation after being output to the sound card and other hardware. Since the essence of scratching is the result of "alternative high-magnification fast playing and slow playing" of the sound, the pitch is high when the playing speed is fast, and the pitch is low when the playing speed is slow. Playing audio according to the speed and acceleration of the user's operation can simulate the effect of scratching. Other processes can also be performed meanwhile.

According to some embodiments of the present application, the foregoing processing of the sampling points in the block includes linear interpolating.

For example, processing the sampling points in the block includes interpolating the sampling points based on speed and acceleration. Generally, the Sinc interpolation algorithm can be used, or the IIR filter can be used for low-pass filtering. Considering that it consumes a lot of performance, and the sound generated by the scratching algorithm has already produced a large distortion, it is not necessary to use too high-precision interpolation. As a preference, linear interpolation can be used. Other suitable interpolations may of course be used.

In the present invention, if the user drags too slowly during operation, since the sampling points in the buffered data are limited, it is possible to access the same point in the buffered data for a period of time when several new sampling points are generated, and the output waveform is similar to the sawtooth, and a large number of high-frequency components are introduced, so that the sound sounds a harsh part. Interpolation can greatly reduce this problem, and linear interpolation has low performance requirements and is fast. According to some embodiments of the present application, reading and playing one of the blocks at the corresponding position in the buffer, based on the speed and acceleration calculated from the displacement data, further includes adding noise to the block prior to playing the block, wherein the magnitude of the noise is proportional to the speed.

For example, before playing the audio data (e.g., before playing a block), it may be selected to add a small amount of noise to the processed sound, making the scratching more realistic. The expression of noise modulation may be:

out_sample*=random( )*scratch_speed_factor+const;

The noise source can essentially be a random number generator, which conforms to an evenly distributed random number, and represents white noise in the frequency domain. Generate a random number for each sampling point, map it to the required range (corresponding to the proportional size of the noise), and add it to a constant const. It is necessary to ensure that the maximum value of the noise is equal to or less than 1 after adding the constant. That is, assuming that the value of the noise is at most 0.2, the maximum value of the constant value is 0.8. Then, this variable is correlated with the speed of the scratching and is positively correlated. In this way, the magnitude of the noise changes with the speed of the scratching, and the process of superimposing the noise is completed. The reason for using multiplication rather than adding is that only the sound volume changes with the speed of the scratching when using additive to superimpose noise. The use of multiplication, referred to in the field of signal processing as "modulation," correlates the modulated signal with the original signal. The modulation method used here is amplitude modulation, AM. In particular, the original signal is preserved while the frequency distribution of the noise is correlated with the frequency of the audio before modulation. Note that if noise modulation is used, the volume should be consistent whether the sound is processed or not processed.

In the present invention, by adding noise, can simulate the sound produced by the rapid friction of the stylus on the surface of the record when scratching.

Figure 3:
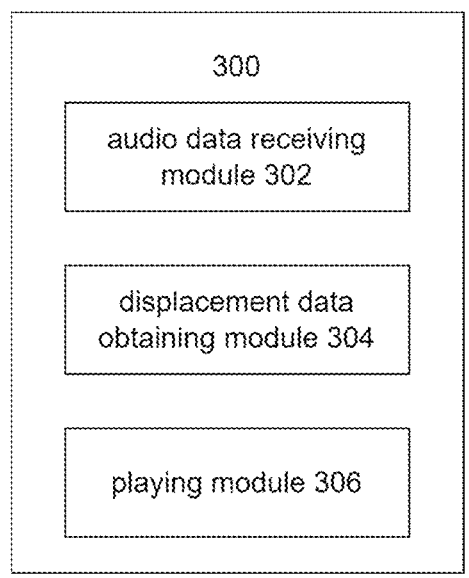
FIG. 3 illustrates a block diagram of a real-time audio processing system according to an embodiment of this invention.

FIG. 3 illustrates a real-time audio processing system according to an embodiment of this invention.

As shown in FIG. 3, the system 300 includes an audio data receiving module 302, a displacement data obtaining module 304, and a playing module 306;

the audio data receiving module 302 receives real-time audio data, and storing the audio data in a buffer, wherein the audio data is stored in a plurality of blocks in the buffer, and each block includes a certain number of sampling points;

the displacement data obtaining module 304 obtains displacement data of a user's operation;

the playing module 306 reads and plays one of the blocks at the corresponding position in the buffer, based on the speed and acceleration calculated from the displacement data, wherein according to the formulas the speed $$v = \frac{x - x_p}{s}$$

and the acceleration $$a = \frac{v - v_p}{b}$$

are calculated, wherein x represents the preprocessed displacement data, $x_p$ represents the preprocessed displacement data received before playing the previous block, s represents an adjustable coefficient for adjusting the sensitivity of the response to the user's operation, $v_p$ represents the speed calculated before playing the previous block, and b represents the number of the groups of sampling points in the block, wherein the group of sampling points represents a group of sampling points having the same time and different channels.

The first embodiment is a method embodiment corresponding to the present embodiment, which can be implemented in cooperation with the first embodiment. The relevant technical details mentioned in the first embodiment are still valid in the present embodiment, and in order to reduce repetition, details are not described herein. Accordingly, the relevant technical details mentioned in the present embodiment may also be applied to the first embodiment.

According to some embodiments of the present application, a real-time audio processing device is disclosed, including a memory storing computer-executable instructions and a processor configured to execute the instructions to implement the real-time audio processing method.

The first embodiment is a method embodiment corresponding to the present embodiment, which can be implemented in cooperation with the first embodiment. The relevant technical details mentioned in the first embodiment are still valid in the present embodiment, and in order to reduce repetition, details are not described herein. Accordingly, the relevant technical details mentioned in the present embodiment may also be applied to the first embodiment.

According to some embodiments of the present application, a computer storage medium encoded using a computer program is disclosed, the computer program including instructions that are executed by more than one computer to implement the real-time audio processing method.

The first embodiment is a method embodiment corresponding to the present embodiment, which can be implemented in cooperation with the first embodiment. The relevant technical details mentioned in the first embodiment are still valid in the present embodiment, and in order to reduce repetition, details are not described herein. Accordingly, the relevant technical details mentioned in the present embodiment may also be applied to the first embodiment.

In some cases, the disclosed embodiments may be implemented in hardware, firmware, software, or any combination thereof. The disclosed embodiments may also be implemented in the form of instructions or programs carried or stored on one or more transient or non-transient machine-readable (e.g., computer-readable) storage media, which may be read and executed by one or more processors or the like. When instructions or programs are run by a machine, the machine may perform the various methods described above. For example, the instructions may be distributed over a network or other computer-readable medium. Thus, a machine-readable medium may include, but is not limited to, any mechanism for storing or transmitting information in a form readable by a machine (e.g., a computer), such as a floppy disk, an optical disk, an optical disk read-only memory (CD-ROMs), a magneto-optical disk, a read-only memory (ROM), a random access memory (RAM), an erasable programmable read-only memory (EPROM), an electronically erasable programmable read-only memory (EEPROM), a magnetic or optical card, or a flash or tangible machine-readable memory for transmitting network information through electrical, optical, acoustic, or other forms of signals (e.g., a carrier wave, an infrared signal, a digital signal, etc.). Thus, a machine-readable medium includes any form of machine-readable medium suitable for storing or transmitting electronic instructions or machine (e.g., computer) readable information.

The embodiments of the present application have been described in detail above in connection with the drawings, but the use of the technical solutions of the present application is not limited to the various applications mentioned in the examples of the present patent, and various structures and variations can be readily implemented with reference to the technical solutions of the present application to achieve the various advantages mentioned herein. Various changes made without departing from the purpose of the present application shall fall within the scope of the patent of the present application, within the knowledge of one of ordinary skill in the art.

The invention claimed is:

1. A real-time audio processing method for simulating scratching in games applied to a terminal, the method including:
step 1, receiving real-time audio data, and storing the audio data in a buffer, wherein the audio data is stored in a plurality of blocks in the buffer, and each block includes a certain number of sampling points;
step 2, obtaining displacement data of a user's operation;
step 3, deriving the first order difference of the displacement data to obtain the speed, deriving the second order difference of the displacement data to obtain the acceleration, and reading and playing one of the blocks at a corresponding position in the buffer, based on the speed and the acceleration, wherein according to a formula to calculate the first order difference $$d = \frac{x - x_p}{s}$$

and a formula to calculate the second order difference $$d' = \frac{d - d_p}{b},$$

the first order difference and the second order difference are calculated, wherein x represents preprocessed displacement data, $x_p$ represents preprocessed displacement data received before playing a previous block, s represents an adjustable coefficient for adjusting a sensitivity of a response to the user's operation, $d_p$ represents a first order difference calculated before playing the previous block, and b represents a number of one or more groups of sampling points in the block, wherein the group of sampling points represents a group of sampling points having a same time and different channels.

2. The method of claim 1, wherein step 2 further includes:
determining whether the user has not performed an operation or has stopped the operation; if so, playing the audio data in real time at a normal speed; if not, performing step 3.

3. The method of claim 2, wherein said reading and playing one of the blocks at the corresponding position in the buffer, based on the speed and the acceleration, further includes:
determining the block to be read according to the speed and acceleration; and
processing the sampling points in the block according to the speed and acceleration.

4. The method of claim 3, wherein the processing of the sampling points in the block includes linear interpolating.

5. The method of claim 1, wherein the preprocessing of the displacement data includes:
scaling a received value of the displacement data, so that a range of one or more values of the displacement data that can be received is an interval: [0, the number of the groups of sampling points in the buffer].

6. The method of claim 1, said reading and playing one of the blocks at the corresponding position in the buffer, based on the speed and the acceleration, further includes adding noise to the block prior to playing the block, wherein the magnitude of the noise is proportional to the speed.

7. A real-time audio processing system for simulating scratching in games, including an audio data receiving module, a displacement data obtaining module, and a playing module;
the audio data receiving module receives real-time audio data, and stores the audio data in a buffer, wherein the audio data is stored in a plurality of blocks in the buffer, and each block includes a certain number of sampling points;
the displacement data obtaining module obtains displacement data of a user's operation;
the playing module derives the first order difference of the displacement data to obtain the speed, derives the second order difference of the displacement data to obtain the acceleration, and reads and plays one of the blocks at the corresponding position in the buffer, based on the speed and the acceleration, wherein according to a formula to calculate the first order difference $$d = \frac{x - x_p}{s}$$

and a formula to calculate the second order difference $$d' = \frac{d - d_p}{b},$$

the first order difference and the second order difference are calculated, wherein x represents preprocessed displacement data, $x_p$ represents preprocessed displacement data received before playing a previous block, s represents an adjustable coefficient for adjusting a sensitivity of a response to the user's operation, $d_p$ represents a first order difference calculated before playing the previous block, and b represents a number of one or more groups of sampling points in the block, wherein the group of sampling points represents a group of sampling points having a same time and different channels.

8. A real-time audio processing device for simulating scratching in games, including a memory storing computer-executable instructions and a processor configured to execute the instructions to implement the real-time audio processing method for simulating scratching in games according to claim 1.

9. A computer storage medium encoded using a computer program, the computer program including instructions that are executed by more than one computer to implement the real-time audio processing method for simulating scratching in games according to claim 1.

* * * * *